United States Patent [19]

Chow

[11] Patent Number: 5,542,092
[45] Date of Patent: Jul. 30, 1996

[54] METHOD AND SYSTEM FOR SETTING BUS ADDRESSES IN ORDER TO RESOLVE OR PREVENT BUS ADDRESS CONFLICTS BETWEEN INTERFACE CARDS OF A PERSONAL COMPUTER

[75] Inventor: Yu-Chun Chow, Hsinchu, Taiwan

[73] Assignee: Accton Technology Corporation, Hsinchu, Taiwan

[21] Appl. No.: 482,954

[22] Filed: Jun. 15, 1995

Related U.S. Application Data

[63] Continuation of Ser. No. 9,934, Jan. 27, 1993, abandoned.

[51] Int. Cl.[6] .................... G06F 13/00; G06F 11/00; G06F 7/04
[52] U.S. Cl. .................... 395/800; 395/500; 395/280; 395/185.06
[58] Field of Search ................... 395/800, 500, 395/275; 340/825.04, 825.52

[56] References Cited

U.S. PATENT DOCUMENTS

| | | | |
|---|---|---|---|
| 5,111,423 | 5/1992 | Kopec, Jr. et al. | 395/500 |
| 5,161,102 | 11/1992 | Griffin et al. | 395/800 |
| 5,175,536 | 12/1992 | Aschliman et al. | 340/825.04 |
| 5,257,387 | 10/1993 | Richek et al. | 395/800 |
| 5,274,771 | 12/1993 | Hamilton et al. | 395/275 |
| 5,353,432 | 10/1994 | Richek et al. | 395/500 |
| 5,367,640 | 11/1994 | Hamilton et al. | 395/275 |

*Primary Examiner*—Alyssa H. Bowler
*Assistant Examiner*—Walter D. Davis, Jr.
*Attorney, Agent, or Firm*—Bacon & Thomas

[57] ABSTRACT

A method and system for resolving or preventing bus address conflicts between interface cards of a personal computer involves using a register instead of a switch to allow a user to select an address based on programming. When a conflict occurs between addresses of two interface cards, one of the interface cards may be re-addressed by re-programming the card with no need for manually setting a switch.

2 Claims, 3 Drawing Sheets

METHOD AND SYSTEM FOR SETTING BUS ADDRESSES IN ORDER TO RESOLVE OR PREVENT BUS ADDRESS CONFLICTS BETWEEN INTERFACE CARDS OF A PERSONAL COMPUTER

This application is a continuation of application Ser. No. 08/009,934, filed Jan. 27, 1993, now abandoned.

BACKGROUND OF THE INVENTION

The present invention relates to a method and system for resolving or preventing bus address conflicts between interface cards of a personal computer, by using a register instead of a switch for the purpose of address setting, thereby allowing a user to select an address based on programming such that when conflicts occur between addresses of two interface cards, the cards may be re-addressed by programming. In addition, a temporary register is provided to allow for verification and prevent writing of incorrect information in the address register or unintended resetting of other interface cards which could cause a malfunction and system crash.

DESCRIPTION OF THE PRIOR ART

Ordinary conventional bus interface cards of personal computers have their addresses set by a number of switches, but there are several drawbacks to such cards.

First, there are different ways used to set the address and a user can only understand its manner of setting by referring to a user's manual.

Second, when two interface cards have the same address setting, aa user must open the case of the personal computer and take out interface cards to reset them.

The aforementioned procedure is not only troublesome, but also offsets the advantages of convenience and time-saving which are the principal reasons for using a computer. Thus, the conventional method and system are in need of research and improvement.

It is accordingly the objective of the invention to overcome the drawbacks and inconvenience caused by the above described methods and apparatus for setting the bus addresses of interface cards for presently available personal computers.

SUMMARY OF THE INVENTION

Accordingly, the present invention provides a method and system for resolving or preventing but address conflicts between interface cards of a personal computer, by using a register instead of a switch setting to set the bus address, the address setting being stored in the register; and by controlling the content of the register using programming to enable a user to clearly select the address required according to a more user-friendly programming interface.

Further, the invention provides a method and system for resolving or preventing bus address conflicts between interface cards of a personal computer in which, when an address conflict occurs between two interface cards, a program can be used to alter the contents of a register by a serial read-out and shift the address of the interface card to a new address the necessity for manual switch setting.

Moreover, the invention provides a method and system for resolving or preventing bus address between interface cards of a personal computer which, instead of altering the contents of a register by directly writing the new address therein, checks whether the new address is intended for the address card to prevent writing an unintended address to the interface cards resulting in a system malfunction or crash.

The present invention will be understood more fully from the detailed description given below and from the accompanying drawings of the preferred embodiments of the invention.

DETAILED DESCRIPTION OF THE PREFERRED EMBODIMENT

Figure 1:
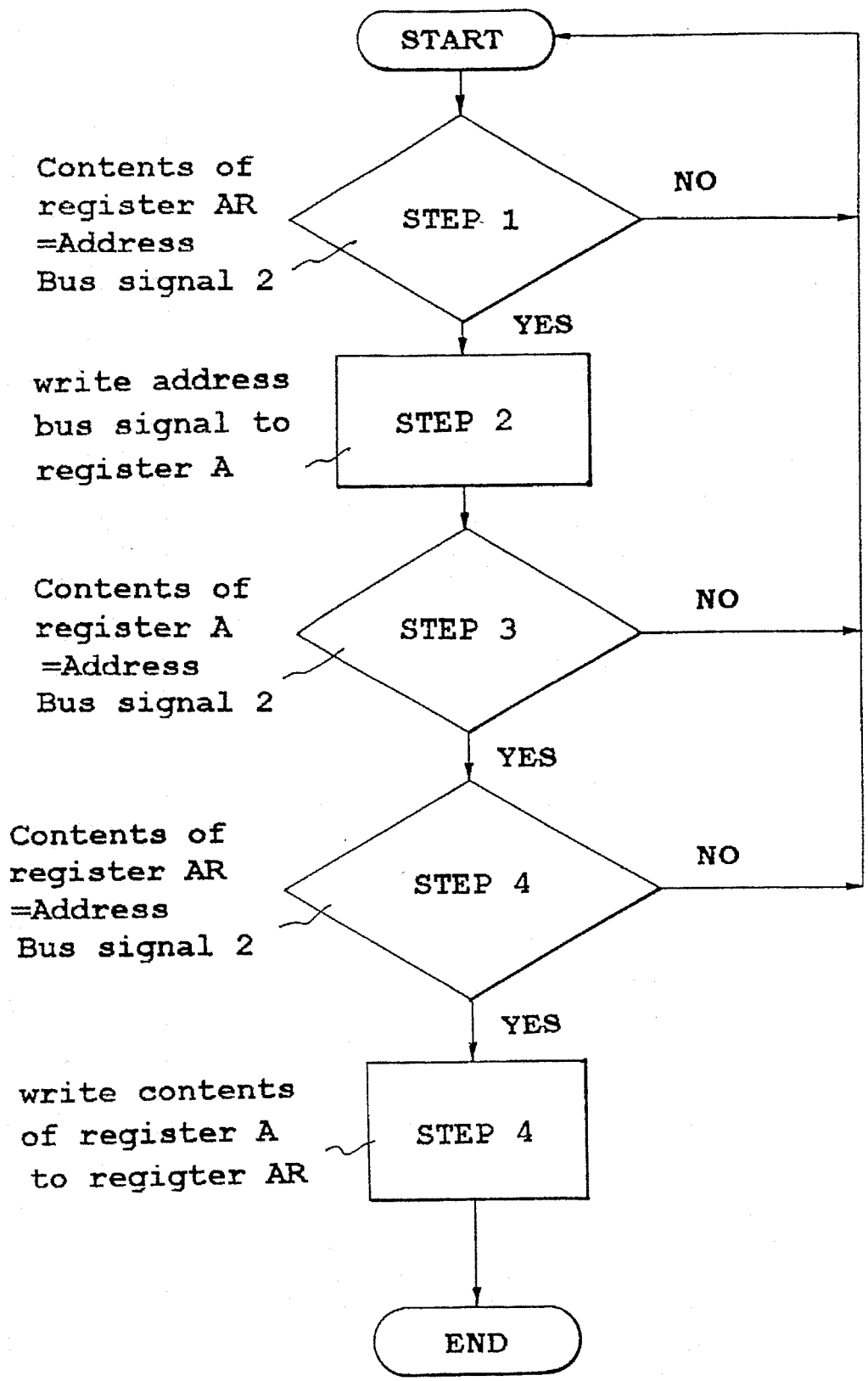
FIG. 1 is a flow chart showing the process steps for resolving or preventing bus address conflicts between interface cards of a personal computer according to the present invention.

FIG. 1 is a flow chart showing process steps for resolving or preventing bus address conflicts between interface cards of a personal computer according to the present invention, in which there is no need to alter the content of a register by direct input, but rather involves first reading the contents of the register while storing the new address temporarily, as follows:

Step 1 involves, preferably, reading the register continuously for 5 times. If there is any other intervening action (such as, e.g., reading other registers or any write-in operation), the procedure is repeated from the beginning.

In step 2, the new address is read once and stored temporarily in the second register.

In step 3, the second register is successively read for 4 times. As in step 1, if any other actions intervene, the reset procedure is re-started.

In step 4, the old address is re-read and compared with the new address, and then the new address is stored in the address register to complete the operation of address alteration.

Figure 2:
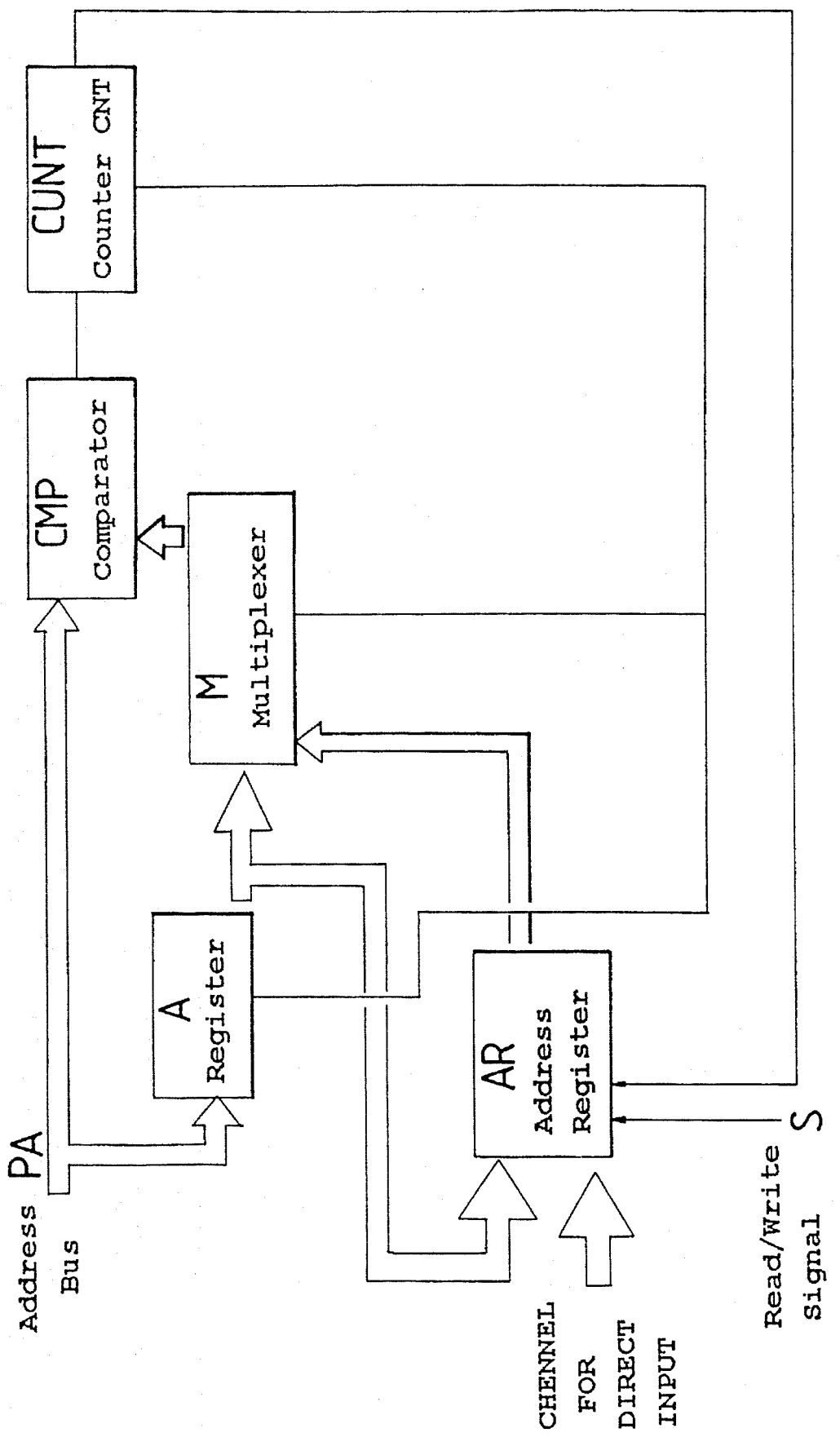
FIG. 2 shows a system for resolving or preventing bus address conflicts between interface cards of a personal computer according to the present invention.

As depicted in FIG. 2, a system for resolving or preventing bus address conflicts between interface cards of a personal computer required to complete the above-described steps includes:

a normal signal source S, that provides a usual read or write instruction signal;

an address register AR, for temporarily storing a signal from signal source S and another signal from a register A;

a multiplexer M., which acts as a selectable switch for selectively allowing the passage of signals from address register AR and register A;

an address bus PA, which carries the address signal from personal computer;

register A, for temporarily storing an address signal received from address bus PA and transmitting it to multiplexer M or address register AR;

a comparator CMP, for receiving a data signal from multiplexer M, comparing it with the signal on the address bus PA and then outputting a signal indicating the comparison results to the counter CNT; and a counter CNT, which connects to the output node of comparator CMP and is driven by the signal resulting from the comparison.

At the start of the operation of the system, the multiplexer M transmits a signal from the address register AR to the comparator CMP to compare it with the signal from the address bus PA, which should both be in the form of the current address. If they are alike, a pulse signal is sent to the counter CNT. If not, the counter CNT is cleared. When 5 successive pulse signals are counted by the counter CNT, the multiplexer M is switched to register A and then, at the time of next pulse, the data of the address bus PA is stored in the register A for comparison, the data on the address bus having been switched to the new address. Thereafter, when the comparator CMP operates 4 times upon detecting a match and the counter CNT counts to 4, the multiplexer M is switched back to the address register AR for the last comparison of the old (current) address with the old address again present on the address bus. Provided all comparisons are successful, the new address stored at the sixth cycle in the register A is written to the address register AR to replace the "old" or "current" address with the new address and thus the procedure for resetting the bus address of the card is completed.

It should be noted that a channel available for direct storage of an address in the address register AR is also conserved in the above said system and procedure.

Figure 3:
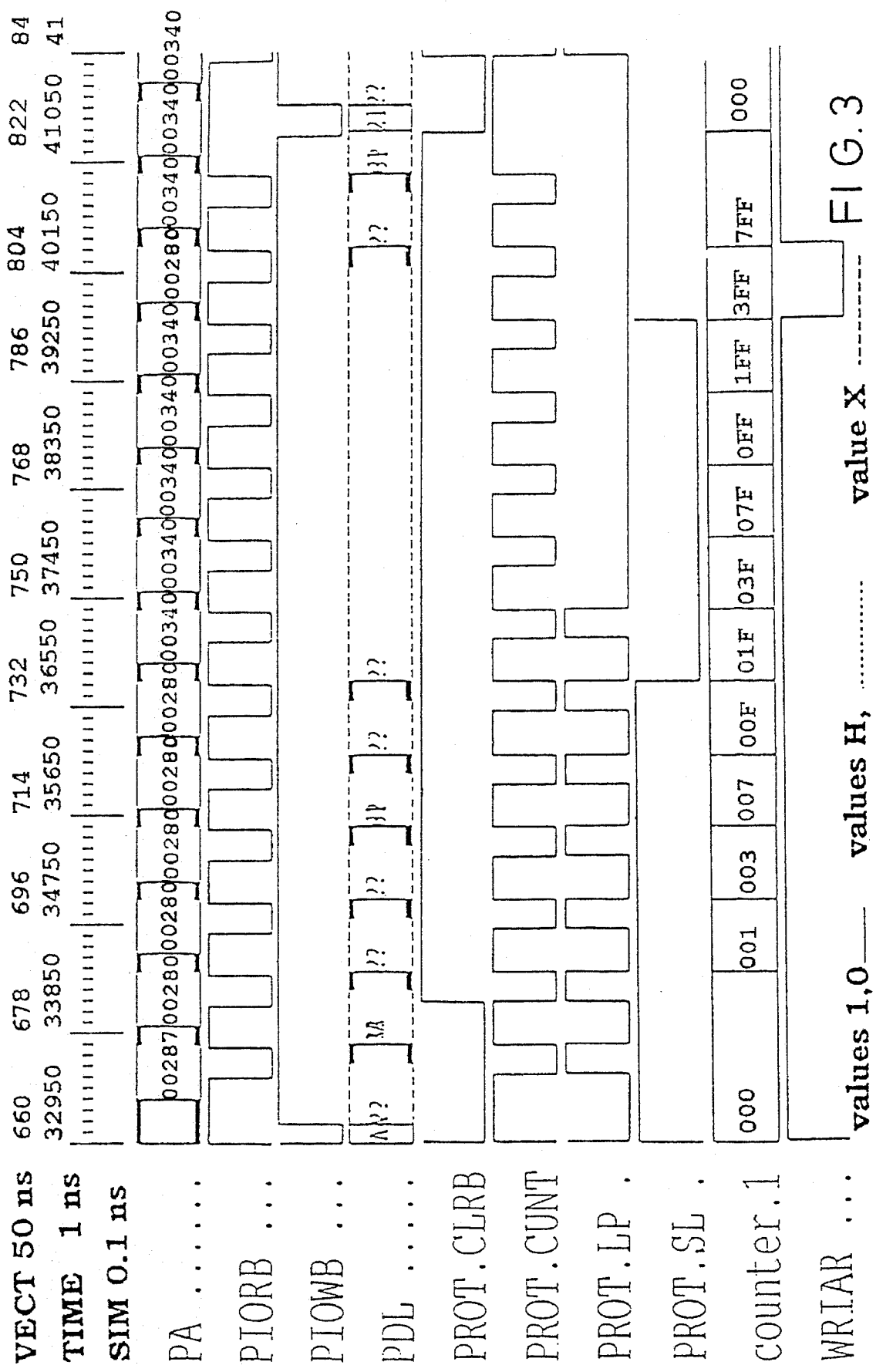
FIG. 3 shows simulated experimental results of the invention.

FIG. 3 shows the results of a computer simulation of the invention, in which the abbreviations have the following meanings:

PA: an address bus

PIORB: a computer read-out signal

PIOWB: a computer write-in signal

PDL: a data bus

PROT. CNT.: a counting signal

PROT. LP: a signal for writing in a register A

PROT. SL: a multiplexer switching signal

Counter. 1: a counter

WRIAR: a signal written-in an address register.

In this example, when the address on bus PA is switched to 280, the bus address of the interface card of a personal computer is still set at the old address. After reading-out from the address register consecutively for 5 times, the switch signal PROT.SL is triggered. Then, when reading-out for the sixth time, the storing signal is activated and the signal is stored in the temporary register A. Thereafter, upon reading out for the eleventh time, the write signal WRIAR of the address register is triggered whereupon the address stored in register A is written to address register AR.

Although the present invention has been fully described by way of example, it is to be noted here that various changes and modifications will be apparent to those skilled in the art. Therefore, unless such changes and modifications depart from the scope of the present invention as defined by the appended claims, they should be construed as included therein.

What is claimed is:

1. A method for resetting a bus address of an interface card of a personal computer, the interface card including an address register and a second register, comprising the steps of:

a) reading contents of the address register and comparing the contents of the address register with an address present on an address bus, and restarting the method if the contents of the address register and the address present on the address bus are not the same during any of a plurality of successive comparisons;

b) reading a new address from the address bus and storing the new address in the second register, the new address representing a new address to be assigned to the interface card;

c) performing an error checking procedure to assure that the new address stored in the second register is a correct address to be assigned to the card, said procedure including:

i) reading contents of the second register and comparing the contents of the second register with the new address present on the address bus ii) restarting the method if the contents of the second register and the new address present on the address bus are not the same during any of a plurality of successive comparisons; and d) if the new address present on the address bus is still the same as the address present in the second register after the plurality of successive comparisons, re-reading the address register and comparing its contents to the new address on the address bus, and then writing the new address stored in the second register to the address register.

2. A system for resetting a bus address of an interface card in a personal computer, comprising:

an address register on said card;

a second register on said card;

a multiplexer on said card for selectively providing an output from said address register or said second register to one input of a comparator;

means including said second register for storing an address on an address bus and transmitting same to the address register or the multiplexer;

a comparator on said card, a first input of which is connected to the multiplexer and a second input of which is connected directly to the address bus, the output being connected to a counter, said counter supplying a pulse signal to the address register when a match between said first and second comparator inputs is detected wherein the multiplexer transmits an address stored in the address register to the comparator to initially compare it with a an address present on the address bus, and if they are the same, the pulse signal is sent to the counter causing the address stored in the address register to again be transmitted so that it may be compared with the address present on the address bus, and if a predetermined number of successive pulse signals is counted by the counter, then the multiplexer is switched to the second register, and an address representing a new address to be assigned to the interface card is stored in the second register and successively compared with the address on the address bus, during an error checking procedure for assuring that the new address is a correct address to be assigned to the interface card, to generate another pulse signal if a match is found, and if a predetermined number of successive pulse signals is counted by the counter, the address stored in the address register is once again compared with the address present on the address bus, whereupon the address present on the address bus is written into the address register to replace the address stored in the address register.

* * * * *